(12) United States Patent
Sendag et al.

(10) Patent No.: US 7,721,048 B1
(45) Date of Patent: May 18, 2010

(54) SYSTEM AND METHOD FOR CACHE REPLACEMENT

(75) Inventors: Resit Sendag, Wakefield, RI (US); Ayse Yilmazer, Marlborough, MA (US); Augustus K. Uht, Cumberland, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 382 days.

(21) Appl. No.: 11/686,851

(22) Filed: Mar. 15, 2007

Related U.S. Application Data

(60) Provisional application No. 60/782,653, filed on Mar. 15, 2006.

(51) Int. Cl.
*G06F 12/00* (2006.01)
*G06F 13/00* (2006.01)
*G06F 13/28* (2006.01)
*G06F 15/00* (2006.01)
*G06F 7/38* (2006.01)
*G06F 9/00* (2006.01)
*G06F 9/44* (2006.01)

(52) U.S. Cl. .................. 711/133; 711/136; 711/118; 712/233; 712/239; 712/237

(58) Field of Classification Search .................. None
See application file for complete search history.

(56) References Cited

U.S. PATENT DOCUMENTS 5,787,465 A * 7/1998 Jouppi et al. ............... 711/117
6,725,338 B2 * 4/2004 Gomez et al. .............. 711/137
6,799,263 B1 * 9/2004 Morris et al. ............... 712/207

OTHER PUBLICATIONS

Bhargava et al., "Accurately modeling speculative instruction fetching in trace-driven simulation," IEEE Performance, Computers and Communications Conference, 1999.

Chou et al., "Microarchitecture optimizations for exploiting memory-level parallelism," International Symposium on Computer Architecture, 2004.

Iacobovici et al., "Effective stream-based and execution based data prefetching," International Conference on Supercomputing, 2004.

Jouppi, "Improving direct-mapped cache performance by the addition of a small fully-associative cache and prefetch buffers," International Symposium on Computer Architecture, 1990.

(Continued)

*Primary Examiner*—Sheng-Jen Tsai
*Assistant Examiner*—Ralph A Verderamo, III
(74) *Attorney, Agent, or Firm*—Gauthier & Connors LLP

(57) ABSTRACT

A computer processing system is disclosed that includes a cache that includes cache blocks of data. The system includes a marking sub-system, an ordering sub-system, and a replacement sub-system. The marking sub-system identifies and marks cache blocks that were provided to the cache via a wrong path with marking data. The ordering sub-system provides an order in which the cache blocks of data will be replaced in the cache, and the ordering sub-system is responsive to the marking data. The replacement sub-system replaces cache blocks in the cache in accordance with the ordering sub-system as required.

20 Claims, 13 Drawing Sheets

OTHER PUBLICATIONS

Martin et al., "Multifacet's General Execution-driven Multiprocessor Simulator (GEMS) Toolset," Computer Architecture News, vol. 33, No. 4, Sep. 2005.

Mauer et al., "Full-System Timing-First Simulation," Joint International Conference on Measurement and Modeling of Computer Systems, 2002.

Moudgill et al., "An approach for quantifying the impact of not simulating mispredicted paths," Performance Analysis and Its Impact in Design, 1998.

Mutlu et al., "Cache filtering techniques to reduce the negative impact of useless speculative memory references on processor performance," Symposium on Computer Architecture and High Performance Computing, 2004.

Mutlu et al., "Understanding the effects of wrong-path memory references on processor performance," Workshop on Memory Performance Issues, 2004.

Mutlu et al., "Runahead execution: An alternative to very large instruction windows for out-of-order processors," International Symposium on High-Performance Computer Architecture, 2003.

Rotenberg et al., "A study of control independence in superscalar processors," International Symposium on High Performance Computer Architecture, 1999.

Sendag et al., "Exploiting the prefetching effect provided by executing mispredicted load instructions," Euro-Par, 2002.

Sendag et al., "The Impact of Incorrectly Speculated Memory Operations in a Multithreaded Architecture," IEEE Transactions on Parallel and Distributed Systems, vol. 16, No. 3, pp. 271-285, Mar. 2005.

Chen et al., "Using Incorrect Speculation to Prefetch Data in a Concurrent Multithreaded Processor," International Parallel and Distributed Processing Symposium, 2003.

Sendag et al., "The Effect of Executing Mispredicted Load Instructions on Speculative Multithreaded Architecture," Workshop on Multi-threaded Execution, Architecture and Compilation, 2002.

Moshovos et al., "JETTY: Filtering Snoops for Reduced Energy Consumption in SMP Servers," International Symposium on High-Performance Computer Architecture, 2001.

Moshovos, "RegionScout: Exploiting Coarse Grain Sharing in Snoop-Based Coherence," International Symposium on Computer Architecture, 2005.

Saldanha et al., "Power Efficient Cache Coherence," Workshop on Memory Performance Issues, 2001.

Ekman et al., "TLB and Snoop Energy-Reduction using Virtual Caches in Low-Power Chip-Multiprocessors," International Symposium on Low-Power Electronics and Design, 2002.

Ekman et al., "Evaluation of Snoop-Energy Reduction Techniques for Chip-Multiprocessors," Workshop on Duplicating, Deconstructing, and Debunking, 2002.

Tendler et al., "POWER4 system microarchitecture," IBM Technical White Paper, 2001.

Wilkes, "The memory gap and the future of high performance memories," Computer Architecture News, vol. 29, No. 1, pp. 2-7, Mar. 2001.

Yeh et al., "Alternative implementations of two-level adaptive branch prediction," International Symposium on Computer Architecture, 1992.

Sohi et al., "Multiscalar Processors," International Symposium on Computer Architecture, 1995.

Culler et al., "Parallel programming in Split-C," Supercomputing, 1993.

Uht et al., "Levo-A Scalable Processor with High IPC," Journal of Instruction-Level Parallelism, vol. 5, 2003.

\* cited by examiner

| Benchmark | Description | Input Data Set |
|---|---|---|
| *fft* | Complex 1-D FFT | 64K points |
| *radix* | Integer radix sort | 2M integers, radix 1024 |
| *ocean* | Simulates large-scale ocean movements | 128x128 ocean |
| *water-spatial* | Simulation of water molecules | 512 molecules |
| *em3d* | Electromagnetic force simulation | 400K nodes, degree 2, span 5, 15% remote |

FIG. 2

| Parameter | | Value |
|---|---|---|
| Processors | | 16 UltraSPARC III processors |
| Processor Parameters | | 2 GHz 15-stage pipeline, out-of-order execution |
| | | 8-wide dispatch/retirement |
| | | 256/128-entry ROB/scheduler |
| | | 10 cycle branch misprediction penalty |
| | | GSHARE branch predictor with 4K PHT |
| | | 64-entry return address stack |
| | | 32 Entry CAS and CAS exception table |
| L1 Caches | | Split I/D, 32KB 2-way, 128 Byte Blocks, with 2ns access latency |
| | | 32 Entry MSHRs |
| L2 Caches | | Unified, 2 MB 2-way, 20ns hit latency |
| | | Exclusive L1 and L2s |
| Main Memory | | 4 GByte per bank, 240ns DRAM latency |
| Interconnect | | Hierarchical Switch |

FIG. 3

SYSTEM AND METHOD FOR CACHE REPLACEMENT

PRIORITY

The present application claims priority to U.S. Provisional Patent Application Ser. No. 60/782,653 filed Mar. 15, 2006.

BACKGROUND

Shared-memory multiprocessor (SMP) systems are typically built around a number of high-performance out-of-order superscalar processors, each of which employs aggressive branch prediction techniques in order to achieve high issue rate. During program execution, these processors speculatively execute the instructions following the target of a predicted branch instruction. When a branch is mispredicted, the processor must restore its state to the state that existed prior to the mispredicted branch before the processor can start executing instructions down the correct path. However, during speculative execution, i.e., before the branch outcome is known, the processor speculatively issues and executes many memory references down the wrong-path. Although these wrong-path memory references are not allowed to change the processor's architectural state, they do change the data and instructions that are in the memory system, which can affect the processor's performance.

Previous analyses have studied the effects that speculatively executed memory references have on the performance of out-of-order superscalar processors. Wrong-path memory references may function as indirect prefetches by bringing data into the cache that are needed later by instructions on the correct execution path. Unfortunately, these wrong-path memory references also increase the amount of memory traffic (i.e., increased bandwidth consumption) and can pollute the cache with cache blocks that are not referenced by instructions on the correct path. Of these two effects, cache pollution—particularly in the L2 cache—is the dominant negative effect.

There is a need for a more efficient and economical cache memory system, and in particular, a cache memory system that retains the positive effects of prefetching, but improves the performance of an SMP system without significantly increasing the complexity of the memory subsystem.

In this study, we proposed an enhancement that tries to minimize the negative effects of wrong-path memory references, while retaining their positive effects (i.e., prefetching), to improve the performance of an SMP system without significantly increasing the complexity of the memory subsystem. Specifically, we propose and evaluate a cache replacement policy that is wrong-path aware. For this purpose, we add a field to each cache line to indicate whether or not that cache line was due to an instruction on the correct-path or the wrong-path. When evicting a cache block from a set, evict the oldest wrong-path cache block. Our results show that this simple mechanism can significantly reduce the negative impact that wrong-path memory accesses have on the performance of SMP systems.

SUMMARY

The invention provides a computer processing system that includes a cache that includes cache blocks of data. In accordance with an embodiment, the system includes a marking sub-system, an ordering sub-system, and a replacement sub-system. The marking sub-system identifies and marks cache blocks that were provided to the cache via a wrong path with marking data. The ordering sub-system provides an order in which the cache blocks of data will be replaced in the cache, and the ordering sub-system is responsive to the marking data. The replacement sub-system replaces cache blocks in the cache in accordance with the ordering sub-system as required.

BRIEF DESCRIPTION OF THE DRAWINGS

The following description may be further understood with reference to the accompanying drawings in which:

FIG. 2 shows a table of benchmarks and input data sets in a system in accordance with an embodiment of the invention;

FIG. 3 shows a table of broadcast (snoop)-based and directory-based SMP systems parameters in a system in accordance with an embodiment of the invention;

Figure 1:
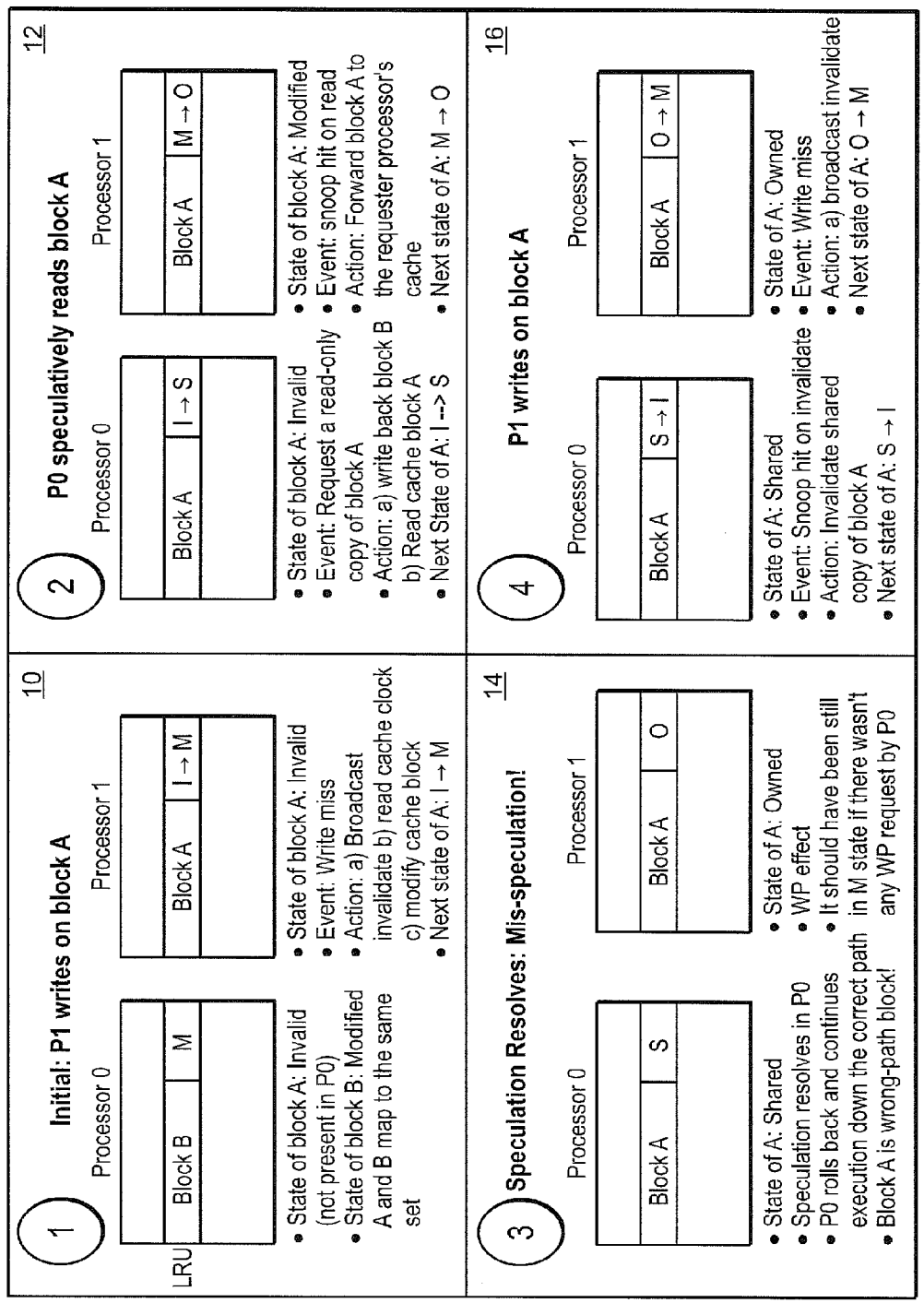
FIG. 1 shows an illustrative diagrammatic view of a cache memory write process (involving steps 1-4) that may be remedied by a system in accordance with an embodiment of the invention.

The drawings are shown for illustrative purposes only.

DETAILED DESCRIPTION

A common feature of current-generation high-performance multiprocessor systems is out-of-order execution processing with aggressive branch prediction. Despite their relatively high branch prediction accuracy, these processors still execute many memory instructions along mispredicted paths. These wrong-path memory references may pollute the caches and increase the amount of cache and memory traffic. On the positive side, however, they may prefetch data into the caches for memory references on the correct path. While computer architects have thoroughly studied the impact of wrong-path effects in uniprocessor systems, there is no comparable work for multiprocessor systems. The present invention considers the effects of wrong-path memory references on the memory system behavior of shared-memory multiprocessor (SMP) systems for both broadcast and directory-based cache coherence.

It has been found that these wrong-path memory references can increase the amount of cache-to-cache transfers by 32%, invalidations by 8% and 20% for broadcast and directory-based SMPs, respectively, and the number of writebacks by up to 67% for both systems. In addition to the extra coherence traffic, wrong-path memory references also increase the number of cache line state transitions by 21% and 32% for broadcast and directory-based SMPs, respectively. In order to reduce the performance impact of these wrong-path memory references, two mechanisms are introduced: filtering wrong-path blocks that are not likely-to-be-used and wrong-path aware cache replacement. These mechanisms are believed to yield speed increases of up to 37%.

Shared-memory multiprocessor (SMP) systems are typically built around a number of high-performance out-of-order superscalar processors, each of which employs aggressive branch prediction techniques in order to achieve a high issue rate. During program execution, these processors speculatively execute the instructions after the predicted target of the branch. When a branch is mispredicted, the processor must restore its state to the state that existed prior to the mispredicted branch before the processor can start executing instructions down the correct path. During speculative execution however, i.e., before the branch outcome is known, the processor speculatively issues and executes many memory references down the wrong-path. Although these wrong-path memory references are not allowed to change the processor's architectural state, they do change the data and instructions that are in the processor's caches, which can affect its performance.

It is known that wrong-path memory references may function as prefetches by bringing data into the cache that are needed later by instructions on the correct execution path. Unfortunately, these wrong-path memory references also increase the amount of memory traffic (i.e., increased bandwidth consumption) and can pollute the cache with cache blocks that are not referenced by instructions on the correct path. Of these two effects, cache pollution—particularly in the L2 cache—is the dominant negative effect. It is important to model wrong-path memory references, since they have a significant impact on the estimated performance.

The present invention considers the effect that wrong-path memory references have on the memory system behavior of SMP systems, in particular, for both broadcast-based and directory-based cache coherence. For these systems, not only do the wrong-path memory references affect the performance of the individual processors, they also affect the performance of the entire system by increasing the number of cache coherence transactions, the number of cache line state transitions, the number of write-backs and invalidations due to wrong-path coherence transactions, and the amount of resource contention (buffer usage, bandwidth, etc.).

To minimize the effect that wrong-path memory references have on the performance of a SMP system, a mechanism is employed to filter out the wrong-path cache blocks that are unlikely to be used on the correct-path. The filtering mechanism uses temporal locality and L1 data cache evictions to determine whether the corresponding cache block should be evicted from the L2 cache. In addition to this filtering mechanism, a cache replacement policy is proposed that is wrong-path aware. More specifically, a field (or bit) is added to each cache line to indicate whether or not that cache line was due to an instruction on the correct-path or the wrong-path. When evicting a cache block from a set, the oldest wrong-path cache block is evicted first. The results show that both of these mechanisms can significantly reduce the negative impact that wrong-path memory accesses have on the performance of SMP systems.

A system of the invention, therefore may analyze and quantify the effect that wrong-path memory accesses have on the performance of SMP systems, in particular, how wrong-path memory accesses affect the cache coherence traffic and state transitions, and the resource utilization. In accordance with an embodiment, a system of the invention includes a filtering mechanism and a replacement policy to minimize the impact that wrong-path memory references have on the performance of SMP systems.

When designing a coherent shared-memory interconnect, an important design decision is the choice of the cache coherence protocol. Popular protocols include: MSI (Modified, Shared, Invalid), MESI (Modified, Exclusive, Shared, Invalid), MOSI (Modified, Owned, Shared, Invalid), and MOESI (Modified, Owned, Exclusive, Shared, Invalid). When a processor accesses memory, the coherence state (i.e., M, O, E, S, or I) of the cache lines in the processors' data caches may change. Although the branch prediction accuracy of modem high-performance processors is high, when a branch misprediction does occur, loads on the mispredicted path access the memory subsystem, which can generate additional coherence traffic. While these extra state transitions do not violate the coherency of the data copies they may degrade the performance of the cache coherence protocol and, subsequently, the performance of the memory subsystem, and, finally, the performance of the SMP.

A speculatively-executed load instruction that is later determined to be on a mispredicted path may bring a cache block into the data cache that replaces another block that may be needed by a load on the correct-path. As a result of these replacements, wrong-path loads pollute the data cache, which may cause additional cache misses. FIG. 1 shows an example of such an event involving four steps as shown. Step 1 involves the starting condition where Processor 0 includes block B (modified) and Processor 1 includes block A (invalid) as P1 writes on block A as shown at 10. Step 2 involves the step of P0 speculatively reading block A as shown at 12. Step 3 involves a mis-speculation regarding Block A being on the wrong path and Processor 1 being in the wrong state as shown at 14. Step 4 involves P1 writing again on Block A with a write miss as shown at 16. In this example therefore, Processor 0 speculatively requests Block A, which causes the replacement. These speculatively accessed memory references may also potentially hide the memory latency for later correct path misses, i.e. prefetching, which may improve the processor's performance.

FIG. 1 therefore shows a summary of the wrong-path effects on a SMP system for MOSI (Modified, Owned, Shared, Invalid) or MOESI (Modified, Owned, Exclusive, Shared, Invalid) coherence protocols. Blocks A and B map to the same cache. Initially and as shown at 10, Block B is in the Modified (M) state in Processor 0's cache and it is the LRU (Least Recently Used) block in the set, while Block A is in Processor 1's cache in the M state. Processor 0 speculatively reads block A as shown at 12. A Shared (S) copy of the block replaces Block B and causes a writeback. The copy in Processor 1's cache changes its state to O. The speculation turns out to be incorrect as shown at 14. Note the extra cache transactions and state transitions. As shown at 16, the Processor 1 writes on block A and gets the exclusive ownership (state of Block A is M now). This causes invalidation to be sent to the caches sharing Block A.

In contrast to the writebacks caused by the correct-path replacements, in a SMP system, the coherence actions caused by wrong-path memory references can also cause writebacks. For example, if the requested wrong-path block has been modified by another processor, i.e., its cache coherence state is M, a shared copy of that block is sent to the requesting processor's cache, which subsequently may cause a replacement. When the evicted block has a cache coherence state of M (exclusive, dirty) or O (shared, dirty) state, this causes an additional writeback, which would not have occurred if the wrong-path load had not accessed memory in the first place. Step 2 in FIG. 1 illustrates this example. Extra writebacks, in addition to what is discussed above, may occur in MSI or MESI coherence SMPs. For these two protocols, if the requested wrong-path block is in the M state in another processor's cache, a shared copy of that block is sent to the requesting processor's cache and also it is written back to the memory. Then the cache coherence state of that cache block is demoted from M to S in the original owner's cache. This additional writeback may not occur without the wrong-path load.

The loads issued down the wrong-path may cause additional invalidations. For example, assuming a MOESI protocol, when a wrong-path load instruction accesses a cache block that another processor has modified, the state of that cache block changes from M to O in the owner's cache and will have a cache coherence state of shared, S, in the requester's cache. If the owner of that cache block needs to write to it, the owner changes the state of that block from O to M and invalidates all other copies of that cache block. Therefore, as this example shows, changes in the cache coherence state of a cache block due to a wrong-path load can cause additional invalidations. FIG. 1, Step 4 illustrates this example.

In addition to causing additional replacements, writebacks, and invalidations, wrong-path memory references can also cause transitions in the cache coherence state of a cache block. For example, when a wrong-path memory reference accesses a modified cache block in another processor's cache, under the MOESI protocol, the cache coherence state of that block changes from M to O in the owner's cache. The state of that cache block changes back to M when the owner writes to that block. These changes in the cache coherence are due solely to the wrong-path access. Therefore, in this case, a wrong-path memory access in another processor results in two extra cache state transitions in the owner's cache (see Steps 2 and 4 in FIG. 1).

The extra cache block state transitions caused by wrong-path memory references may degrade the performance. For example, when implementing a snooping coherence protocol, the operation of detecting a write miss, obtaining the bus, getting the most recent value, and updating the cache cannot be done as if it took a single cycle. This requires adding a number of transient states for pending write misses and writebacks (for a write-back cache). The controller will leave those states when the bus is available. A wrong-path memory reference, which causes this type of extra transitions, competes with other correct-path requests to acquire the bus. The processor will also stall when it requests a block that is in transient state due to an earlier WP request. Such problems are slightly worse in a directory-based system that does not have a broadcast mechanism like a bus, which can be used to order all requests.

Due to these extra replacements, writebacks, invalidations, and changes in the cache coherence state, wrong-path memory accesses increase the amount of traffic due to L1 and L2 cache accesses, as well as increasing the number of snoop and directory requests.

Even if wrong-path memory references do not affect the performance of the SMP system, they still may increase system's overall power consumption. It is known that filtering unnecessary snoops can reduce the total L2 cache power by 30%. Accordingly, reducing the cache line transitions and cache coherence traffic due to wrong-path memory accesses should also reduce the power consumption.

Finally, in addition to the aforementioned effects, wrong-path memory accesses can also increase the amount of resource contention. More specifically, wrong-path memory accesses compete with correct-path memory accesses for the multiprocessor's resources, such as request and response queues at the communication interconnect, and inter-processor bandwidth. The additional cache coherence transactions may increase the frequency of full service buffers. A sufficient network bandwidth is assumed to keep the network contention low. With the possible exceptions of fft, which uses all-to-all communication, and em3d, network contention was not a problem for the benchmarks reviewed below.

FIG. 2 shows at 20 a list of five benchmarks that were used in an embodiment. The first four benchmarks are benchmarks from the SPLASH-2 benchmark suite, while em3d is an electromagnetic force simulation benchmark.

A 16-processor SPARC v9 system running an unmodified copy of Solaris 9 was evaluated. Both snoop-based and directory-based SMP systems were simulated with an invalidation-based cache coherence. The MOSI and MOESI cache coherence protocols were employed, respectively, for the snooping-based and directory-based SMP systems. Each node includes an aggressive, dynamically-scheduled, out-of-order processor core, two-levels of cache, coherence protocol controllers, and a memory controller.

Figure 4A:
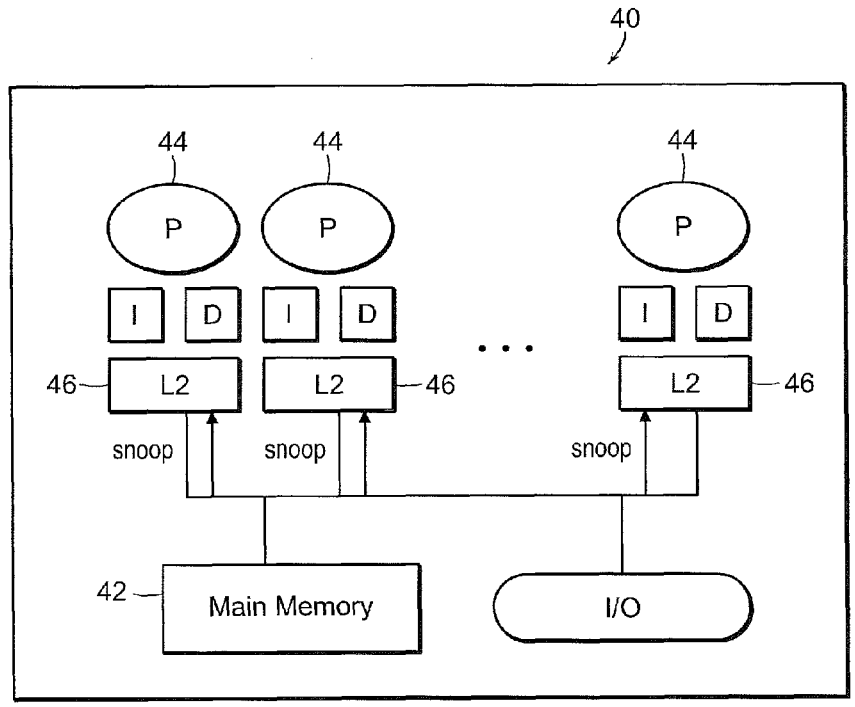
FIGS. 4A and 4B show illustrative diagrammatic views of broadcast and directory based SMPs that may be used with a system in accordance with an embodiment of the invention.
Figure 4B:
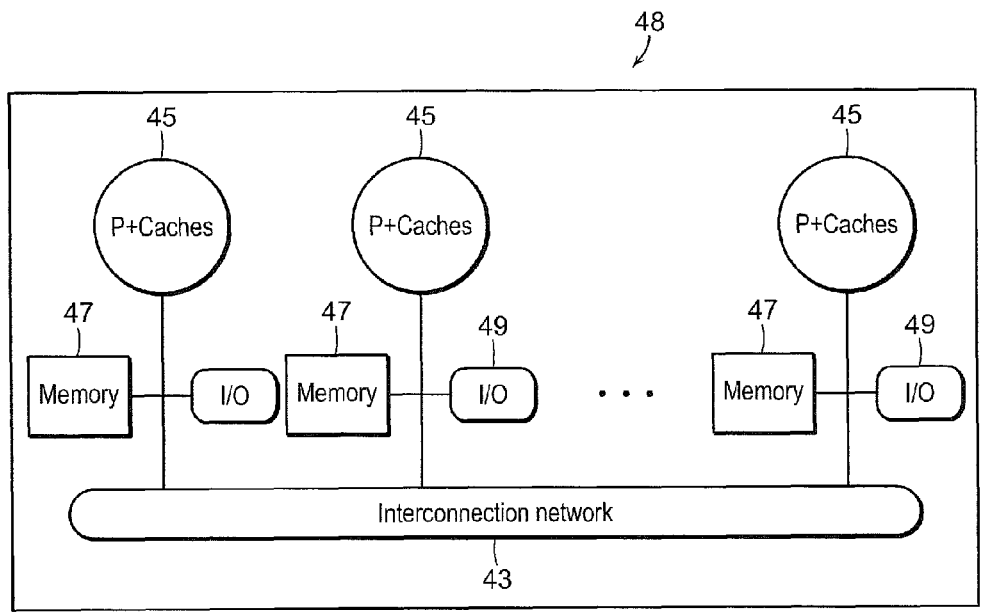

FIG. 3 shows at 30 broadcast (snoop)-based and directory-based SMP system parameters. FIG. 4A shows at 40 a block diagram of a simulated broadcast-based SMP systems that includes a main memory 42 coupled to multiple processors 44 via L2 caches 46. FIG. 4B shows at 48 a block diagram of a simulated directory system that includes an interconnection network 43 coupled to P+caches 45, memory units 47 and I/O units 49 as shown.

Simulation results were collected using a full system simulator that includes cycle-accurate models of an out-of-order processor core, cache hierarchy, various cache coherence protocols, multibanked memory (unified or distributed), and various interconnection networks. The simulation was a timing-first simulation approach in which functional and timing aspects of the simulators are decoupled. The timing modules determined when instructions should be executed. The result of the execution of each instruction, however, is ultimately dependent on the simulator.

To avoid measuring the time needed for thread-forking, measurements were begun at the start of the parallel phase by using a functional simulation to execute the benchmarks until the start of the parallel phase. Then, the first iteration of the loop was used to warm-up the caches and branch predictors. After the first iteration, the benchmark was simulated for an additional iteration to gather our simulation results.

The impact that executing wrong-path memory references have on the caches, the communication between processors due to coherence transactions, and the overall performance of SMP were evaluated. To measure the various wrong-path effects, the speculatively generated memory references were tracked and mark as being on the wrong-path when the branch misprediction was known.

Figure 5:
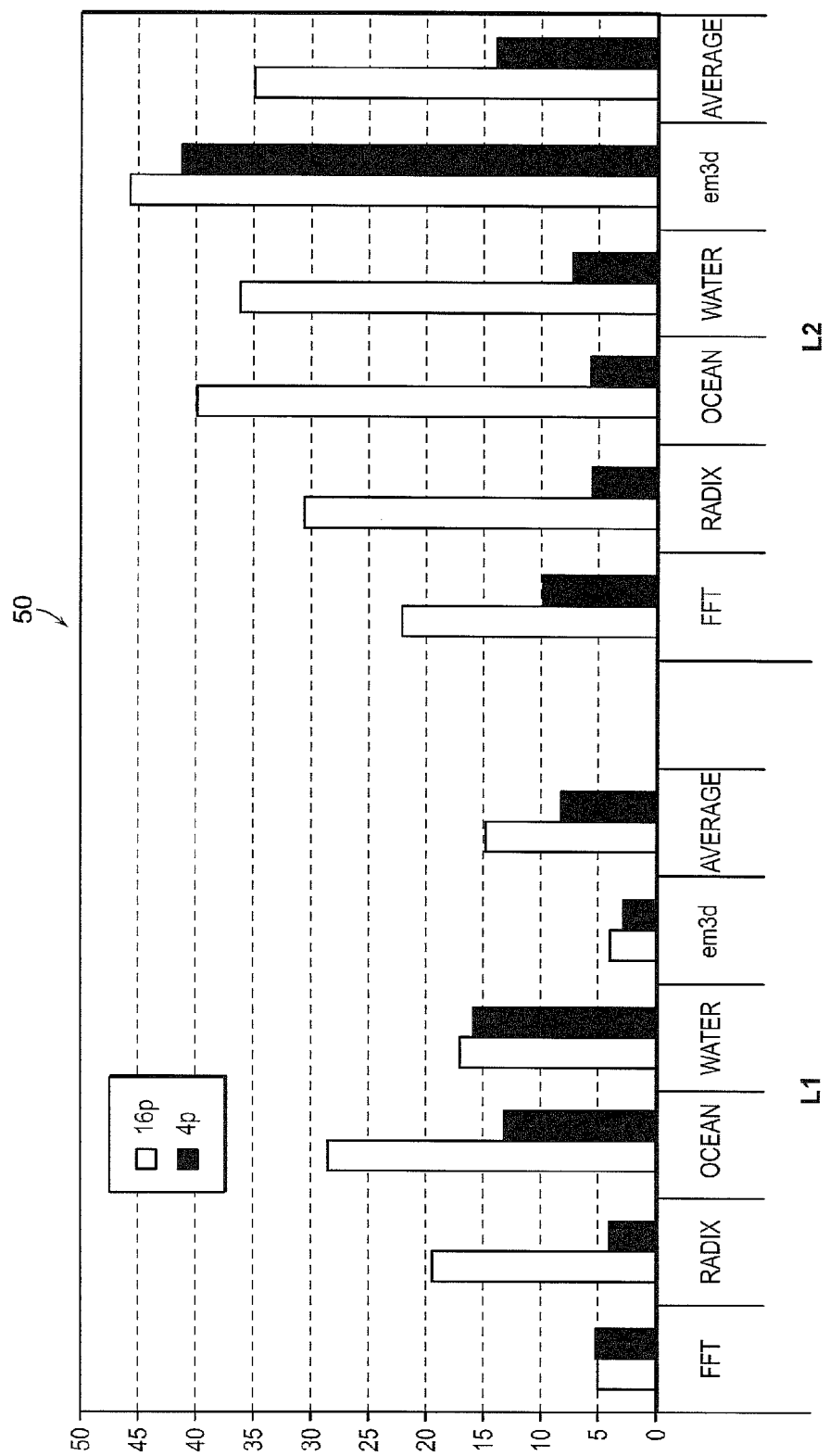
FIG. 5 shows an illustrative graphical representation of the percentage of increase in L1 and L2 cache traffic for broadcast-based SMPs in a system that may be employed in accordance with an embodiment of the invention.
Figure 6:
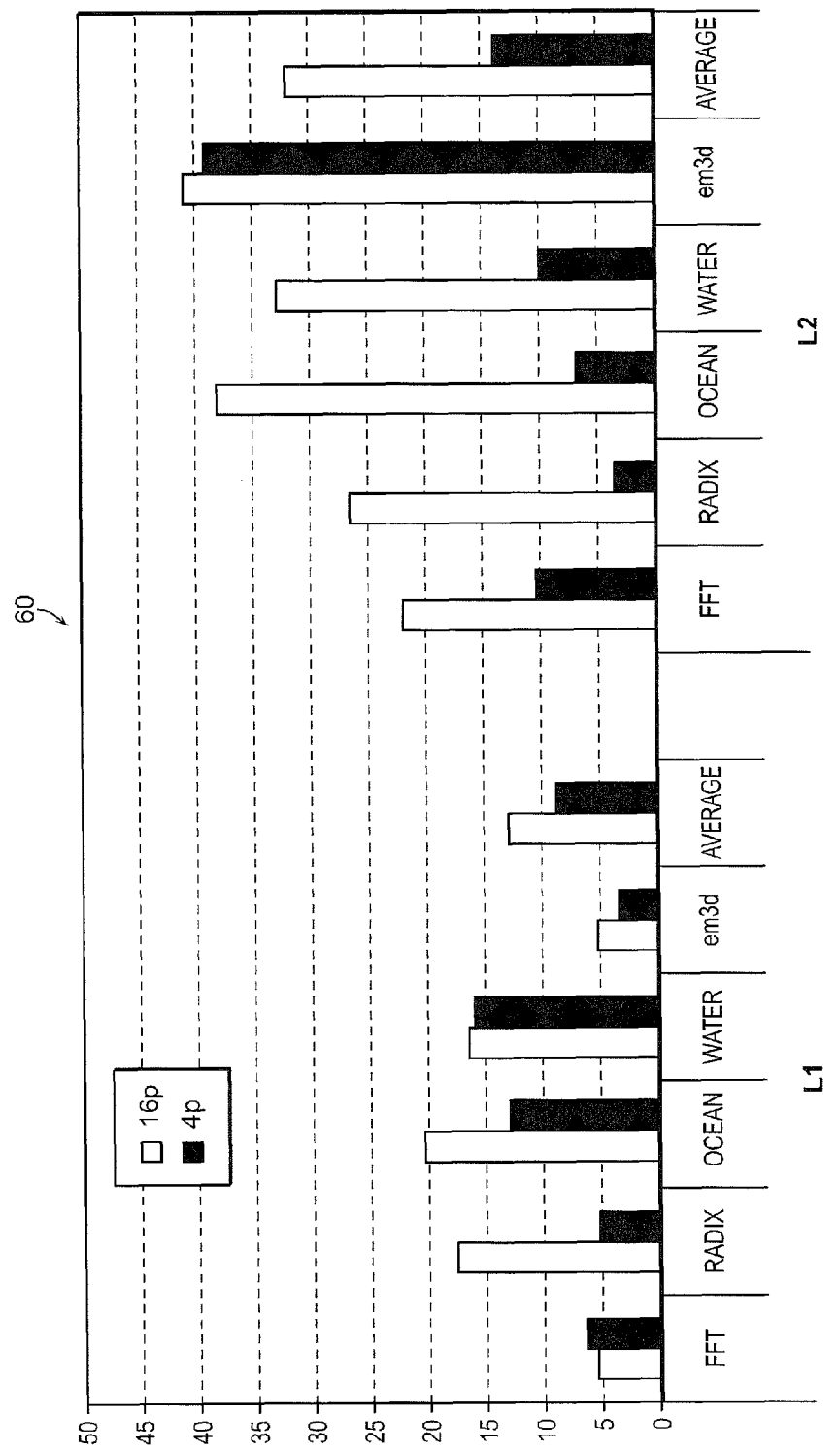
FIG. 6 shows an illustrative graphical representation of the percentage increase in L1 and L2 cache traffic for directory SMPs in a system that may be employed in a system in accordance with an embodiment of the invention.

The percentage increase in the L1 cache, L2 cache, and coherence traffic due to the wrong-path memory references for 4- and 16-processor SMP systems were quantified. FIG. 5 shows at 50 the increase in the traffic between the processor and its L1 data cache and between the L1 cache and the L2 cache due to wrong-path memory references, as a percentage of the total number of memory references, for broadcast-based SMPs. FIG. 6 shows at 60 the same type of data for directory-based SMPs.

FIG. 5 shows that, for a 4-processor broadcast-based SMP, wrong-path loads increase the total number of L1 and L2 cache accesses by an average of 8% and 14%, respectively. For a 16-processor broadcast-based SMP, this increase is 15% for L1 and 35% for L2 cache accesses. For directory-based SMPs, FIG. 6 shows that these loads increase the percentage of L1 and L2 cache accesses by an average of 9% and 14%, respectively, for 4 processors, and 13% and 32%, respectively, for 16 processors. With 16 processors, for all benchmarks and for both SMP systems, the percentage increase in the number of L2 references is larger than the percentage increase in the number of L1 cache references. With 4 processors, however, except em3d, there is no such a trend. For em3d, while the percentage increase in the number of L1 cache accesses is negligible for both 4 and 16 processors and for both systems, the number of L1 misses increases by as much as 45%. Overall, 16-processor SMPs are affected by wrong-path memory references much more than 4-processor SMPs are.

The wrong-path memory accesses increase the number of coherence transactions by an average of 18% and 32%, for 4 and 16 processors, respectively, for both broadcast and directory-based SMPs. For em3d, the coherence traffic increases by over 60%. Extra traffic due to wrong-path memory references increases as the number of processors increases.

From a performance point-of-view, wrong-path memory references can have both a positive and negative effect on the processor's performance by either prefetching data into the caches or by polluting them, respectively. To determine the potential performance impact that wrong-path memory references have in SMP systems, the misses caused by wrong-path loads may be categorized into four groups: unused, used, direct miss, and indirect miss. In the unused wrong-path block category, the wrong-path cache block is either evicted before being used or is never used by a correct-path. On the other hand, cache blocks in the used wrong-path block category are eventually used by a correct-path memory reference. Direct miss cache blocks can severely degrade the systems performance because they replace a cache block that a later correct-path load accesses, but the wrong-path block is evicted before being used. Finally, since unused wrong-path misses change the LRU state of cache blocks in that set, which may eventually cause correct-path misses, we call these misses indirect misses.

Figure 7:
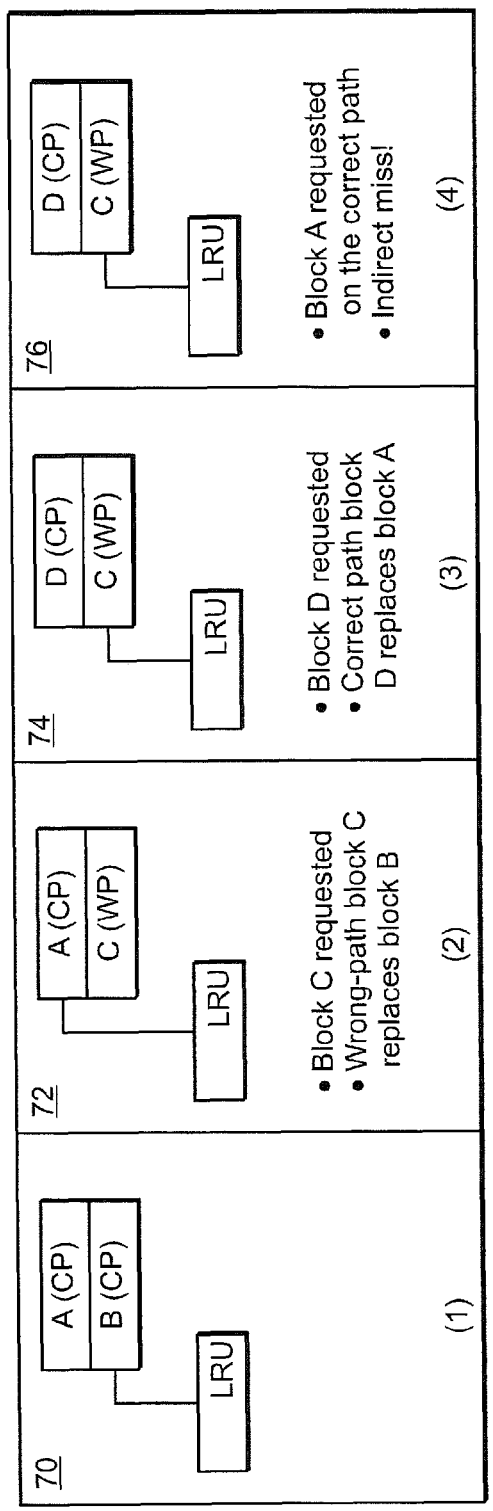
FIG. 7 shows an illustrative diagrammatic view of an example of an indirect miss caused by wrong-path memory references in a system that may benefit from a system in accordance with an embodiment of the invention.

For example, consider that A, B, C and D are cache blocks that map to the same cache set. Assume that in this example, and as shown in FIG. 7: Cache is two-way set-associative cache that initially contains blocks A and B as shown at 70; B is the LRU block as shown at 72; C is the wrong-path reference as shown at 74; and both A and D are on the correct path as shown at 76. In this situation, the sequence of operations is as follows: Wrong-path block C replaces B, correct-path miss block D replaces A, correct path miss block A replaces C. If wrong-path reference for block C did not occur, then the correct-path reference for block A would have been a cache hit because block D would replaced block B instead.

Figure 8:
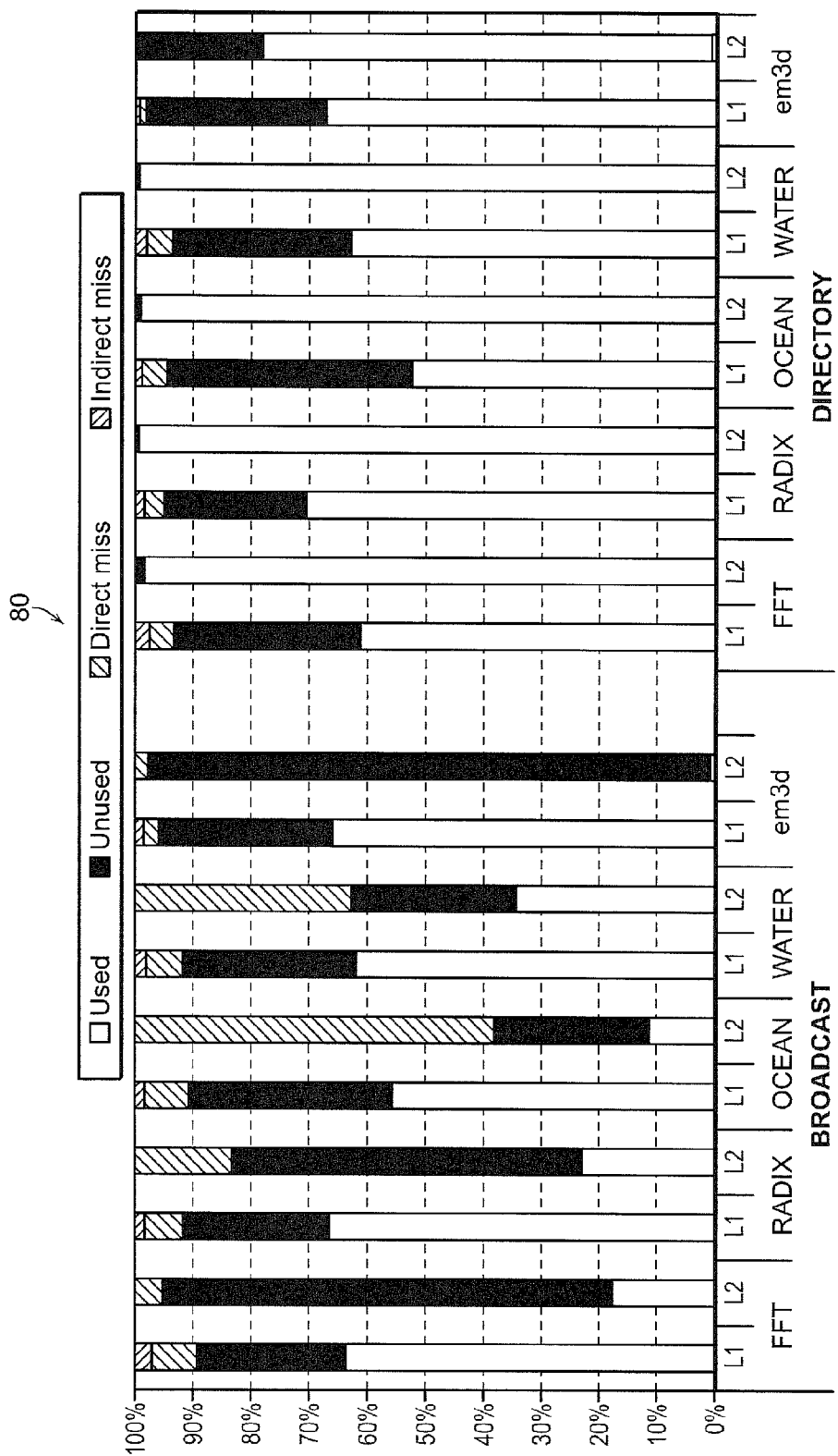
FIG. 8 shows replacements due to wrong-path memory references for a system in accordance with an embodiment of the invention.

FIG. 8 classifies the wrong-path-caused cache misses into the aforementioned four categories as shown at 80. The results show that 55% to 67% of the wrong-path replacements in the L1 data cache and 12% to 36% of the wrong-path replacements in the L2 are used in broadcast-based systems. Direct misses account for 5% to 62% of all wrong-path replacements and account for a higher percentage of wrong-path misses in broadcast-based SMP systems than for directory-based. Finally, indirect misses account for less than 5% of all wrong-path misses for most of the benchmarks and systems tested.

It is important to note that direct and indirect misses are responsible for the pollution caused by the wrong-path memory references. While they have similar effect on the L1 data cache for both broadcast and directory systems, their effects on L2 cache are different between the two SMP systems. For directory-based, almost all of the L2 replacements are used, while the opposite is true for broadcast-based. This suggests that wrong-path memory references have a greater effect on broadcast-based systems. A small number of remote misses caused by wrong-path loads however, may have a disproportionately large performance impact in a directory-based system, as compared to a broadcast-based system.

Broadcast-based cache coherence provides the lowest possible latency to retrieve data since misses can either be served by remote caches or shared memory. In contrast, in a directory-based SMP, misses can be served locally (including the local directory), at a remote home node, or by using both the home node and the remote node that is caching an exclusive copy, i.e., a three-hop miss. The latter case has a higher cost because it requires interrogating both the home directory and a remote cache. Coherence misses account for most of the remote misses.

Correct-path and wrong-path cache coherence transactions may be serviced for broadcast and directory-based SMP systems, respectively. The results are similar for both SMP systems. Namely, remote caches service a greater percentage of the wrong-path misses than for correct-path misses for all benchmarks except em3d. For those benchmarks, the percentage of misses serviced by remote caches varies from 12% to 80% for correct-path loads and 55% to 96% for wrong-path loads. For the directory-based SMP, in all benchmarks, local memory services only a very small percentage of both correct-path and wrong-path memory references.

As described above, wrong-path replacements may cause extra writebacks that would not occur otherwise. The percentage increase in the number of replacements and writebacks due to wrong-path memory references was also reviewed. The percentage increase in the number of E (for directory MOESI) and S line replacements. E→I transitions—which increased by 2% to 63%—are particularly important since the processor loses the ownership of a block and, more importantly, the ability to silently upgrade its value, which can significantly increase the number of invalidations needed for write upgrades. For em3d, there is a large increase in both the replacements and writebacks.

Wrong-path memory accesses increase the number of writebacks from 4% to 67%. It is important to note that writebacks may result in additional stall cycles when an L2 cache miss occurs after the processor starts to perform a writeback, since it cannot begin to service the miss until the writeback completes.

The impact that wrong-path memory references have on the number of cache line state transitions was also analyzed. The results show that the number of cache line state transitions increase by 20% to 24% for a broadcast-based SMPs and by 27% to 44% for directory-based. Although the percentage increase is smaller for the broadcast-based system, the number of cache line state transitions is much higher at the beginning.

A processor loses ownership of an exclusive cache block (M or clean E) when another processor references it. In order to regain ownership, the processor has to first invalidate all other copies of that cache block, i.e., S→I for all other processors. There is 8% to 11% increase in the number of write misses due to wrong-path references—each of which subsequently causes an invalidation—for broadcast-based SMPs; this percentage is higher, 15% to 26%, for the directory-based SMPs.

In accordance with various embodiments, the invention provides systems and methodologies that seek to minimize the negative effects of wrong-path memory references, while retaining their positive effects (i.e., prefetching), to improve the performance of an SMP system without significantly increasing the complexity of the memory subsystem.

The first step to reduce the negative effects of wrong-path memory references is to detect the wrong-path (WP) requests. Mispredicted branches are usually resolved in the Branch Execution Unit (BEU) before most of the wrong-path L1 misses, and before almost all of the wrong-path L2 misses complete. Therefore, whether an L1 or L2 cache miss is down the WP is usually known before the block is placed into the cache. Most of the current processors use Miss Status Holding Registers (MSHRs) to track outstanding memory requests. Each MSHR entry stores the speculative tag for the missed load instruction. When a branch misprediction is signaled by the BEU, the speculative tag for the corresponding branch can be matched with the tags in MSHRs and marked as WP.

In order to implement a WP-aware replacement policy, each cache block also needs a 1-bit to specify whether the block is brought into the cache due to WP or CP (Correct-Path). This bit is set to CP by default. The WP loads which miss in L1 and that are already completed (e.g., serviced by L2 hit) before the branch resolution are not detected and thus marked as CP. However, with the help of a simple mechanism, almost all of the blocks brought by WP loads can be marked as WP. If a speculative load request misses in the L1 and is serviced by the L2, the L1-missed address may be kept in a small first-in-first-out (FIFO) queue (4-8 entries speculative load miss queue, SLMQ) when removed from the MSHRs giving more time to BEU to signal the misprediction. The WP addresses in this queue matching the mispredicted branch tag can then be used to access the data cache and mark the WP blocks. This operation may be done by probing the cache whenever there is available access port to the cache thus does not compete with the ordinary memory requests.

Most of the blocks brought by WP loads may be marked as WP even without this FIFO queue. However, such a queue is useful when a predicted branch instruction's operands depend on a long latency operation (such as a load that misses in L2) to produce the operand value. In this case, we may not be able to capture the WP loads in the MSHRs because of the late branch resolution. Therefore, an SLMQ will be beneficial. On the other hand, another scenario may help on-time marking of load misses as WP. When the branch is resolved but cannot be committed because it is waiting for a long latency operation which is at the reorder buffer head to complete execution and commit, the out-of-order core continues execution. The WP loads in the load queue which were not ready to be issued can become ready after the branch resolution and can simply be marked as WP when placed in the MSHRs if they miss in L1.

Figure 9:
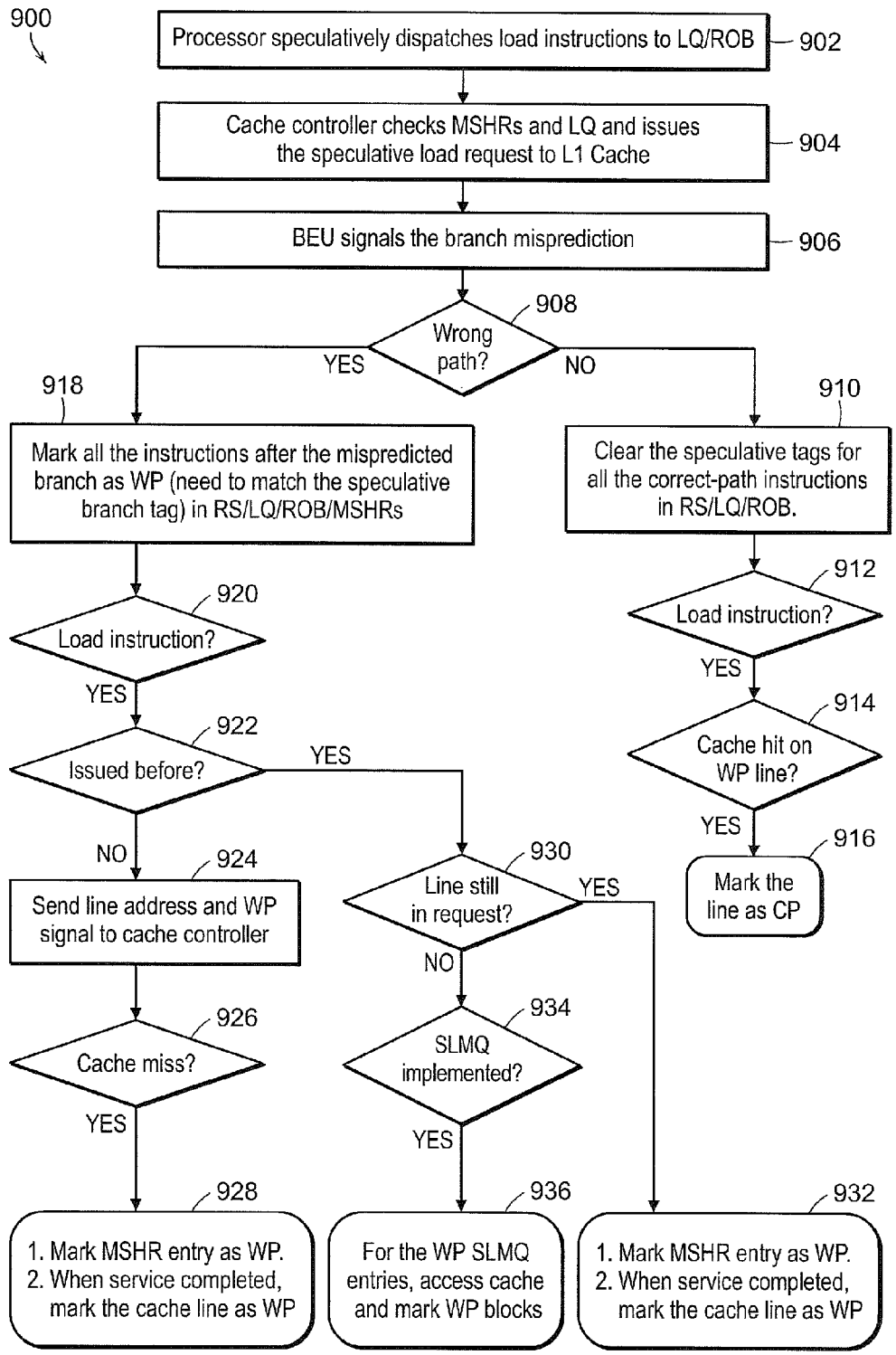
FIG. 9 shows an illustrative diagrammatic flow chart of the operation of a system in accordance with an embodiment of the invention.
Figure 10:
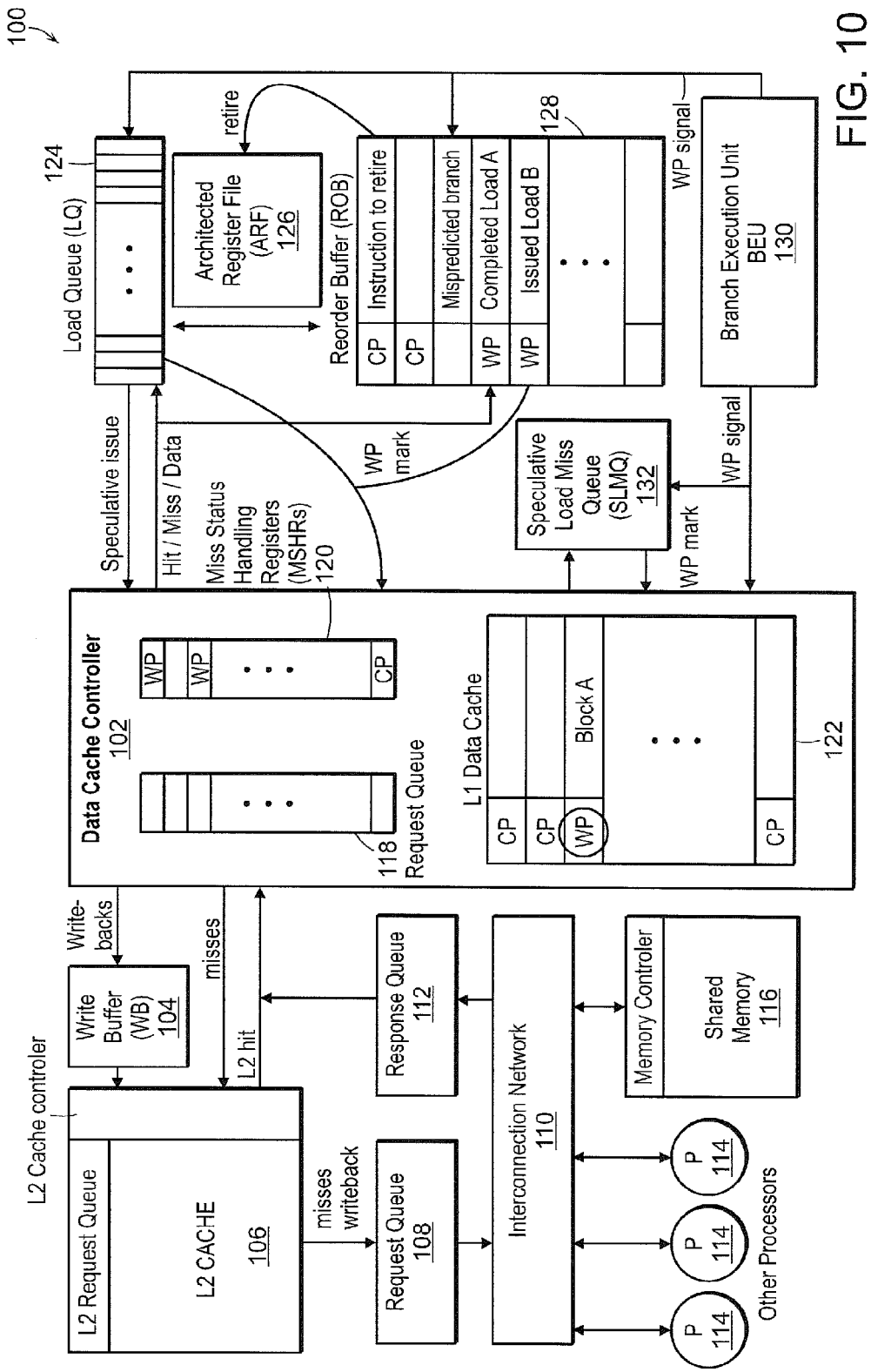
FIG. 10 shows an illustrative diagrammatic view of a functional block diagram of a system in accordance with an embodiment of the invention.

FIG. 9 shows the basic operation of a methodology in accordance with an embodiment of the invention, and FIG. 10 shows a system for implementing a system in accordance with an embodiment of the invention. The following abbreviations are used in the Figures: LQ: Load Queue, ROB: Reorder Buffer, MSHRs: Miss Status Handling Registers; SLMQ: Speculative Load Miss Queue, BEU: Branch Execution Unit, WP: Wrong-Path, CP: Correct-Path. As shown in FIG. 9, the method 900 involves first having the processor speculatively dispatch load instructions to LQ/ROB (step 902). The cache controller then checks MSHRs and LQ, and issues the speculative load request to L1 cache (step 904). The BEU then signals the branch misprediction (step 906).

The system then determines whether the path is a wrong path (step 908). If not, the system then clears the speculative tags for all the correct-path instructions in RS/LQ/ROB (step 910). If the instruction is a load instruction (step 912) and the cache is a hit on WP line (step 914), then the system marks the line as CP (step 916). Otherwise the line is not marked.

If the system determines that the path is a wrong path (step 908), then the system marks all of the instructions after the mispredicted branch as WP in RS/LQ/ROB.MSHRs (step 918). The system must match the speculative branch tag as appropriate. If the instruction is a load instruction (step 920) and was not issued before (step 922) then the system sends a line address and WP signal to the cache controller (step 924). If the cache is a miss, then the system marks the MSHR entry as WP (step 928). When the service is completed, the cache line is marked as WP.

If the load instruction was issued before (step 922), then the system determines whether the line is still in request (step 930). If so, the system marks the MSHR entry as WP, and when service is completed, marks the cache line as WP (step 932). If the line is not still in request (step 930), and if the SLMQ is implemented (step 934), then the system accesses cache and marks WP blocks for the WP SLMQ entries (step 936).

The process may be implemented by a system as shown in FIG. 10 that includes a data cache controller 102 that provides write-backs to a write buffer (WB) 104. The write buffer 104 is coupled to an L2 cache 106 that includes an L2 request queue and an L2 cache controller. The L2 cache 106 is coupled to a request queue 108, which in turn is coupled to an interconnection network 110. The interconnection network is coupled to a response queue 112, other processors 114, and a shared memory unit 116 that includes a memory controller.

The data cache controller 102 includes a request queue 118, a miss status handling register (MSHR) 120, and an L1 data cache 122. The data cache controller 102 is also coupled to a load queue 124 that communicates with a reorder buffer 128 in accordance with an architected register file (ARF) 126, as well as a branch execution unit (BEU) 130. The branch execution unit 130 communicates with the data cache controller as well as a speculative load miss queue (SLMQ) 132. The WP-aware cache system may also be designed for uniprocessor systems.

A WP-aware cache block replacement policy is provided in accordance with an embodiment of the invention. To make the cache replacement policy wrong-path aware, when a block is brought into the cache, it is marked as being either on the correct-path or on the wrong-path. There are several possible ways to design such a mechanism in addition to the specific example discussed above. Later, when a block needs to be evicted from that set in the cache, assuming that all cache blocks are valid (if not, an invalid block is replaced first), wrong-path blocks are evicted first, on a LRU basis if there are multiple wrong-path blocks. The WP block evicted from L1 data cache will now be written into L2 cache (exclusive L1-L2), however, when placed in L2, it will stay as LRU. This will ensure that the WP block that was not used in L1 will not reside in the L2 cache for very long (unless it is used). On the other hand, a wrong-path block that services a correct path reference is marked as if it was on the correct-path, thus excluding it from the wrong-path replacement policy. If all cache blocks originated from a correct-path reference, then the LRU block in that set is chosen for eviction.

Figure 11:
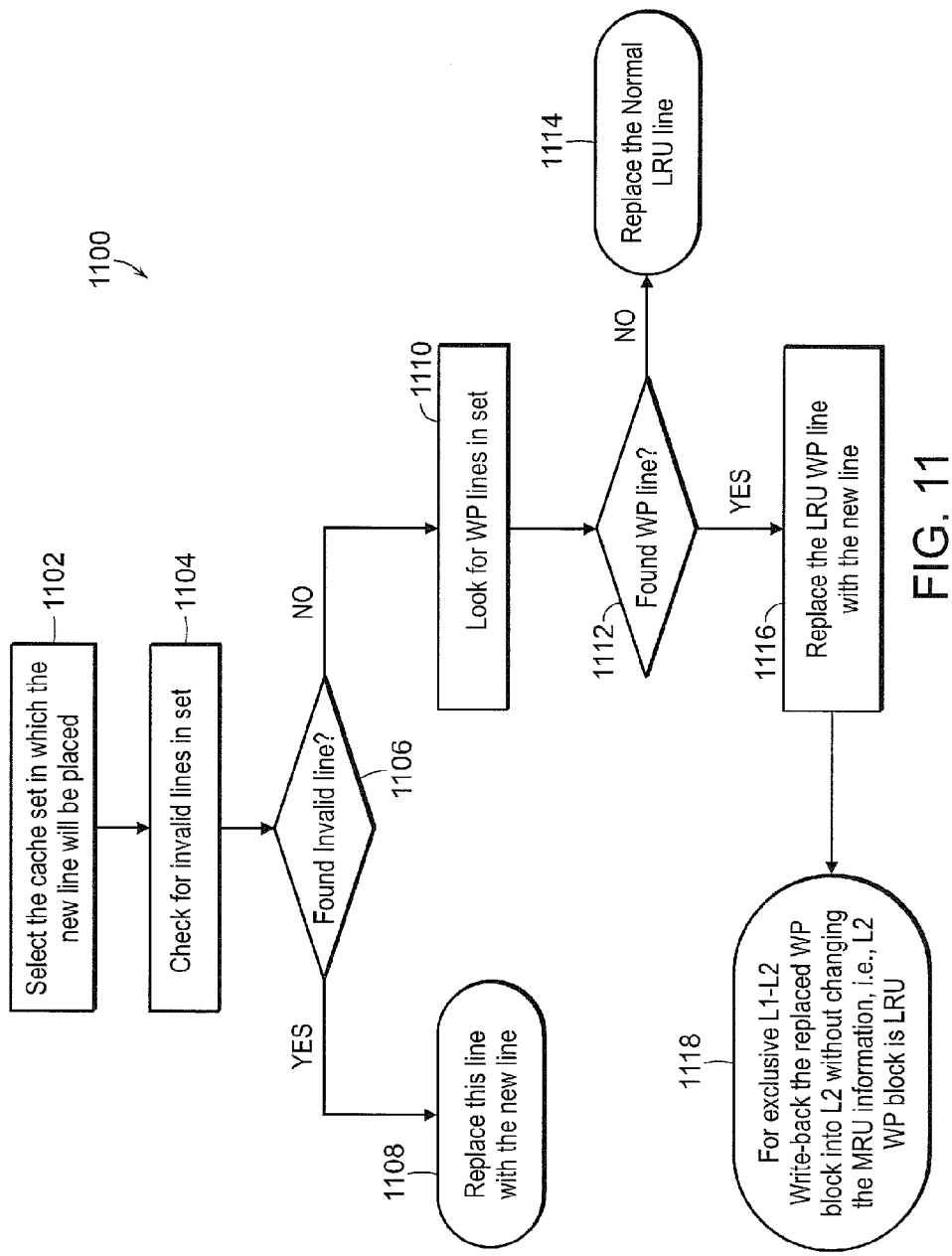
FIG. 11 shows a illustrative diagrammatic flow chart of a wrong-path aware replacement methodology in accordance with an embodiment of the invention.

FIG. 11 shows at 1100 a process for performing a wrong-path aware replacement methodology. As shown in step 1102, the process begins by selecting the cache set in which the new line will be placed. The system then checks for invalid lines in a set (step 1104), and then determines whether a line is found to be invalid (step 1106). If so, then the system replaces the line with a new line (step 1108). If not, the system looks for WP lines in the set (step 1110). If it does not find a WP line (step 1112), the system replaces the normal LRU line (step 1114). If it does finds a WP line (step 1112), the system replaces the LRU WP line with the new line (step 1116). The system then writes back the replaced WP block into L2 without changing the MRU information for exclusive L1-L2, i.e., L2 WP block is LRU (step 1118).

In accordance with a further embodiment, the system further provides a filtering mechanism that reduces the cache pollution due by direct and indirect miss wrong-path references, and by evicting the unused wrong-path blocks early. The filtering mechanism is applied to the L2 cache due to the long latency of L2 instructions.

The filtering mechanism is based on the observation that if a speculatively-fetched cache block is not used while it resides in the L1 cache, then it is likely that that block will not be used at all or will not be used before being evicted from the L2 cache.

Exclusive L1 and L2 caches were evaluated. A block that misses both in L1 and L2 allocates a line only in the L1 cache. Then, when a block is evicted from the L1 cache, it is written to L2.

Figure 12:
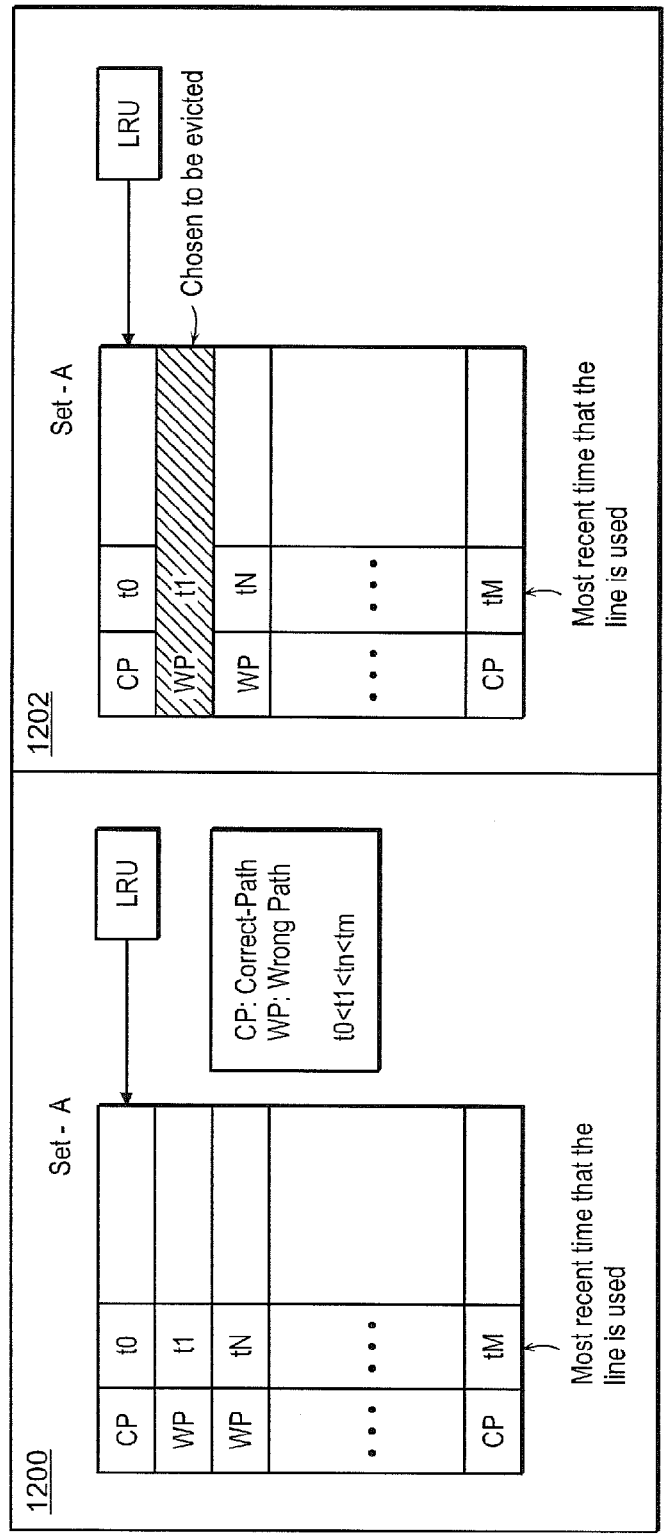
FIG. 12 shows an illustrative diagrammatic view of an example of a WP block eviction in a system in accordance with an embodiment of the invention.

The filtering mechanism works as follows: If a wrong-path block is evicted from the L1 cache before being used by a correct-path memory reference, it is allocated to the L2 cache only if its L2 set has an empty way, i.e., at least one cache way is invalid. If not, then that cache block is discarded, i.e., not allocated to the L2 cache, but written to memory only. A wrong-path block that services a correct-path reference is handled in the same way as a correct-path block. An example of such an eviction is shown at 1200 and 1202 in FIG. 12.

We can further filter wrong-path blocks from being placed in L2 cache by canceling the wrong-path references in the L2 cache request queue as soon as the misprediction is known. For example, if a requested block is an L1 cache miss, a request is sent to the L2 cache controller and placed in a request queue. At the time that the L2 cache controller processes this request, if it is known that the load instruction was on a mispredicted branch path, then this request is simply discarded without being serviced. (If this request were not discarded, it would cause an L2 miss and could possibly replace a valid block in the L2 cache.) If there is an invalid line in the set however, the L2 cache controller services that wrong-path memory reference and overwrites the invalid line. Otherwise, the L2 cache controller processes this request as usual.

Figure 13:
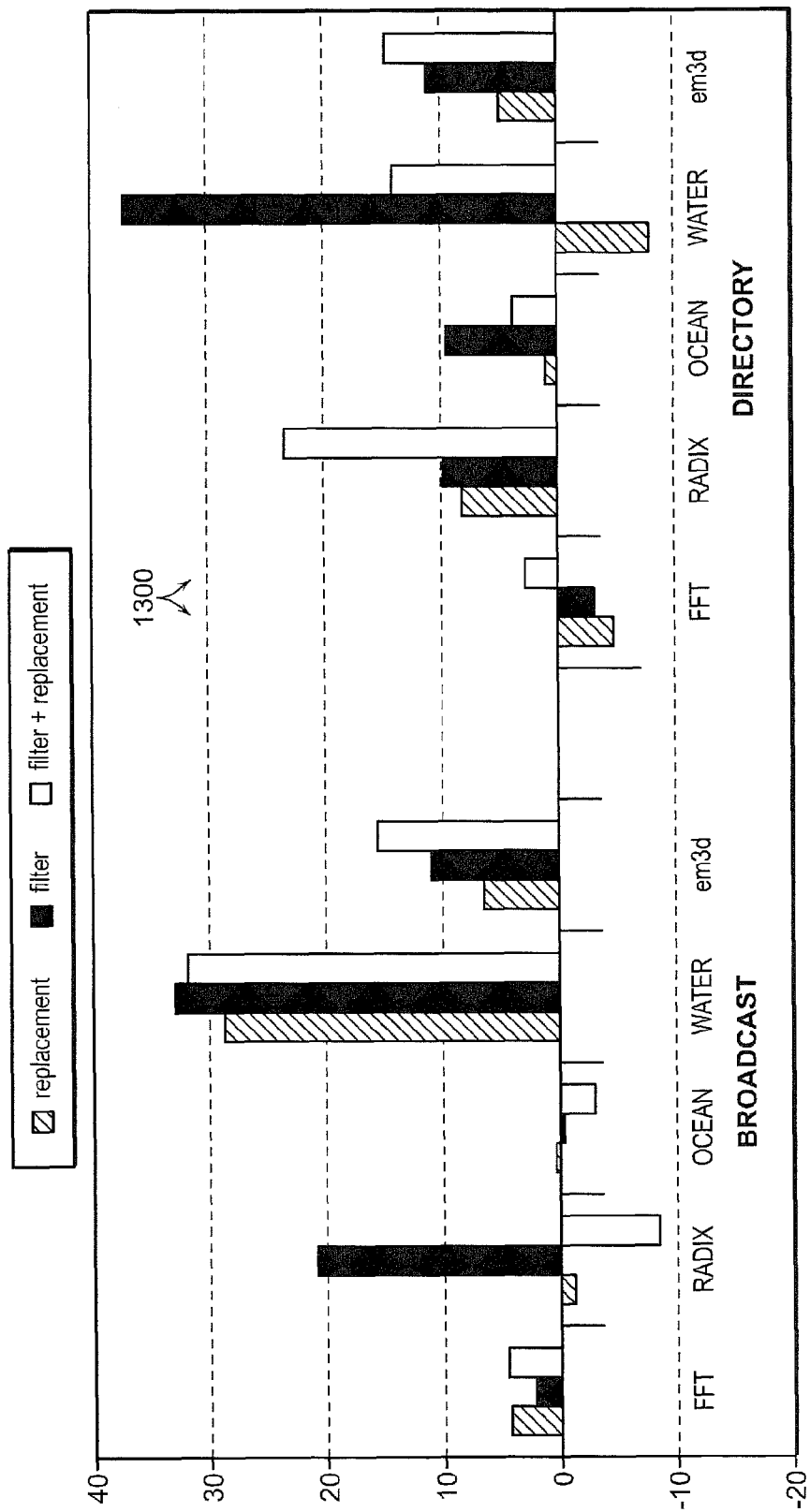
FIG. 13 shows an illustrative graphical representation of the percentage speedup in execution time for a wrong-path aware replacement, an L2 wrong-path filter, and for a combination of both.

FIG. 13 shows at 1300 the speedup results in execution time for wrong-path aware replacement, L2 wrong-path filter, and for combination of both, i.e., filter+replacement. FIG. 13 show that a wrong-path aware replacement policy may perform very well for some benchmarks. For example, for water, all three enhancements yield speedups over 30% for the broadcast-based SMPs. Overall, the performance of the enhancements varies across benchmarks and systems. On average, filtering yields higher speedups than wrong-path aware replacement, while also outperforming replacement for all benchmarks for directory-based SMPs. For broadcast-based SMPs, filtering performs better than wrong-path aware replacement for radix, water and em3d. Employing a simple wrong-path replacement policy does not significantly improve the performance of ocean and fft.

WP-aware replacement policy degrades the performance in some cases: 1% for radix (broadcast), 4% for fft (directory) and 8% for water (directory). The performance degradation is mainly due to the WP-aware replacements that are not useful because they reduce prefetching effect of useful WP blocks by replacing them first (this blocks may be used later by correct path if they weren't replaced). For a WP filter mechanism, only fft (for directory-based SMP) is negatively affected (3% performance degradation for directory-based SMP). This performance degradation is due to the decision that if a WP block is not used in L1 cache it is more likely not to be used in L2 cache. Even if the WP block is not used by a later CP block while it resides in L1 cache, it might have been used later when it resides in L2 cache. A filter policy, which is based on this general observation, therefore, may not work for all applications. For both mechanisms, the performance degradation is due to reducing prefetching effect of some useful WP blocks. Performance degradation however, does not occur often as most of the results are positive. When filter and the wrong-path aware replacement are combined, their advantages may cancel out each other in some cases (radix and ocean in broadcast-based SMPs).

In accordance with various embodiments, the invention provides, therefore, that it is important to model wrong-path memory references in cache coherent shared-memory multiprocessors. Neglecting to model them may result in incorrect design decisions, especially for future systems with longer memory interconnect latencies and processors with larger instruction windows.

Further, for SMP systems, not only do the wrong-path memory references affect the performance of the individual processors due to prefetching and pollution, they also affect the performance of the entire system by increasing the number of cache coherence transactions, the number of cache line state transitions, the number of writebacks and invalidations due to wrong-path coherence transactions, and the amount of resource contention (buffer usage, bandwidth, etc.).

For a workload with many cache-to-cache transfers, wrong-path memory references may significantly affect the coherence actions. Finally, mechanisms such as filtering unlikely-to-be-used wrong-path blocks from being placed into L2 or making the replacement policy wrong-path aware can significantly improve the SMP performance.

Those skilled in the art will appreciate that numerous modifications and variations may be made to the above disclosed embodiments without departing from the spirit and scope of the invention.

What is claimed is:

1. A computer processing system that includes a cache including cache blocks of data, said system comprising:
    marking means for identifying and marking as wrong-path blocks cache blocks that were provided to the cache via a wrong path with marking data, said cache including a first cache (L1) and a second cache (L2);
    ordering means for providing an order in which cache blocks of data will be replaced in the cache, said ordering means being responsive to the marking data;

replacement means for replacing cache blocks in the cache in accordance with the ordering means as required; and write-back means for providing that a wrong-path block that is evicted from the first cache (L1) before being used down a correct path will be placed into the second cache (L2) as the least recently used (LRU) instead of most recently used (MRU).

2. The computer processing system as claimed in claim 1, wherein said marking data includes a single bit of data.

3. The computer processing system as claimed in claim 1, wherein said system includes adjustment means for unmarking cache block that is already marked if the cache block is accessed by the computer processing system.

4. The computer processing system as claimed in claim 1, wherein said system further includes a filtering means for reducing direct and indirect miss wrong path references.

5. The computer processing system as claimed in claim 1, wherein said system further includes a early eviction means for evicting unused wrong path cache blocks with a high priority.

6. The computer processing system as claimed in claim 1, wherein said marking means identifies and marks a plurality of cache blocks responsive to an identification of a single wrong path by a mispredicted branch.

7. The computer processing system as claimed in claim 6, wherein said marking means includes a miss status holding register.

8. The computer processing system as claimed in claim 6, wherein said marking means includes a speculative load miss queue.

9. The computer processing system as claimed in claim 1, wherein said ordering means includes a first-in-first-out stack.

10. The computer processing system as claimed in claim 1, wherein said ordering means includes a reorder buffer.

11. A computer processing system that includes a cache including cache blocks of data, said system comprising:

ordering means for providing an order in which the cache blocks of data will be replaced in the cache, said ordering means being responsive to marking data for identifying and marking as wrong-path blocks cache blocks that were provided to the cache via a wrong path with marking data, said cache including a first cache (L1) and a second cache (L2);

adjustment means for unmarking a cache block that is already marked if the cache block is accessed by the computer processing system;

replacement means for replacing cache blocks in the cache in accordance with the ordering means as required; and write-back means for providing that a wrong-path block that is evicted from the first cache (L1) before being used down a correct path will be placed into the second cache (L2) as the least recently used (LRU) instead of most recently used (MRU).

12. The computer processing system as claimed in claim 11, wherein said system further includes a early eviction means for evicting unused wrong path cache blocks with a high priority.

13. The computer processing system as claimed in claim 11, wherein said marking means includes a miss status holding register and a speculative load miss queue.

14. The computer processing system as claimed in claim 11, wherein said ordering means includes a reorder buffer.

15. A computer processing method that includes a cache including cache blocks of data, said method comprising the steps of:

identifying and marking cache blocks that were provided to the cache via a wrong path with marking data;

providing an ordering in which the cache blocks of data will be replaced in the cache, said ordering being responsive to the marking data;

unmarking a cache block that is already marked if the cache block is accessed by a computer processing system;

replacing cache blocks in the cache in accordance with the ordering as required; and providing that a wrong-path block that is evicted from a first cache (L1) before being used down a correct path will be placed into a second cache (L2) as the least recently used (LRU) instead of most recently used (MRU).

16. The method as claimed in claim 15, wherein said method further includes the step of evicting unused wrong path cache blocks with a high priority.

17. The method as claimed in claim 15, wherein said method further includes the step of providing that a block while it resides in the first cache (L1) determines its replacement policy in the second cache (L2) responsive to a bit that indicates whether the block is a wrong path block or a correct path block.

18. The method as claimed in claim 15, wherein said method further includes the step of marking as a correct-path block a wrong-path block that services a correct path.

19. The method as claimed in claim 15, wherein said method further includes the step of allocating to the second cache (L2) a wrong-path block evicted from the first cache (L1) that is not used by a correct-path memory reference, only if the second cache (L2) has at least one cache way that is invalid.

20. The method as claimed in claim 15, wherein said method further includes the step of canceling wrong-path references in the second cache (L2) request queue as soon as a mis-prediction is identified.

* * * * *